(12) United States Patent
Komori

(10) Patent No.: US 12,013,378 B2
(45) Date of Patent: Jun. 18, 2024

(54) GAS CHROMATOGRAPHY ANALYSIS SYSTEM

(71) Applicant: SHIMADZU CORPORATION, Kyoto (JP)

(72) Inventor: Yuki Komori, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/502,298

(22) Filed: Oct. 15, 2021

(65) Prior Publication Data

US 2022/0178887 A1 Jun. 9, 2022

(30) Foreign Application Priority Data

Dec. 4, 2020 (JP) ................................. 2020-201719

(51) Int. Cl.
*G01N 30/16* (2006.01)
*G01N 30/02* (2006.01)

(52) U.S. Cl.
CPC ....... *G01N 30/16* (2013.01); *G01N 2030/025* (2013.01)

(58) Field of Classification Search
CPC .................................................... G01N 30/24
See application file for complete search history.

(56) References Cited

U.S. PATENT DOCUMENTS 4,944,781 A * 7/1990 Ruggirello ............. G01N 30/24
73/23.41
2016/0245730 A1 8/2016 Neal

FOREIGN PATENT DOCUMENTS

JP 57-73657 U 10/1980
JP 09-325153 A 12/1997
JP 2012-42253 A 3/2012

OTHER PUBLICATIONS

Japanese Office Action dated Dec. 5, 2023 in Japanese Application No. 2020-201719.
Office Action issued Jul. 17, 2023 in Chinese Application No. 202111374292.1.
Chinese Office Action issued Apr. 12, 2024 in Application No. 202111374292.1.

* cited by examiner

*Primary Examiner* — Jamel E Williams
*Assistant Examiner* — Alex T Devito
(74) *Attorney, Agent, or Firm* — Sughrue Mion, PLLC

(57) ABSTRACT

A gas chromatograph main body (2) comprising an upper surface on which a plurality of injection ports are provided, an injector (4A) arranged on the gas chromatograph main body (2), for corresponding to an injection port (10-1 to 10-4) optionally selected from a plurality of the injection ports (10-1 to 10-4), and being configured to inject a sample through the corresponding injection port (10-1 to 10-4), and a sampler (6) for supplying a vial containing liquid to the injector (4A). The sampler (6) is arranged at a position determined according to a position of the injector (4A) on the gas chromatograph main body (2) so as to have a specific positional relationship with the injector (4A). The sampler is engaged with the gas chromatograph main body (2) or the injector (4A).

3 Claims, 6 Drawing Sheets

GAS CHROMATOGRAPHY ANALYSIS SYSTEM

BACKGROUND OF THE INVENTION

1. Field of the Invention

The present invention relates to a gas chromatography analysis system.

2. Description of the Related Art

In a gas chromatography analysis system, an injector is generally mounted on a gas chromatograph main body. The injector is a device that injects a sample through an injection port provided on an upper surface of the gas chromatograph main body. An analysis unit including a sample vaporizing chamber for vaporizing a sample injected through an injection port to generate sample gas, a separation column for separating components in the sample gas generated in the sample vaporizing chamber, and the like is mounted inside the gas chromatograph main body.

The injector is provided with a turret in which a vial containing a sample is set, and the sample is sucked from the vial set in the turret by a syringe and injected into the analysis unit of the gas chromatograph main body (see Japanese Patent Laid-open Publication No. 9-325153). There is a limit to the number of vials that can be set in the turret, and in a case where the number of samples is large, not all the samples can be set in the injector. For this reason, a sampler that supplies a vial containing a sample to the injector is sometimes used together with the injector. The sampler includes a vial table on which a plurality of vials are arranged, and a transfer arm that transfers the vials arranged on the vial table to the turret of the injector.

SUMMARY OF THE INVENTION

There is a case where a plurality of the analysis units are mounted inside one of the gas chromatograph main body. In this case, a plurality of injection ports corresponding to the analysis units are provided on an upper surface of the gas chromatograph main body. The user can perform analysis using an optional analysis unit among a plurality of the analysis units mounted on the gas chromatograph. In a case where the analysis unit to be used for analysis is changed, the position of the injector on the gas chromatograph main body needs to be changed in accordance with the position of an injection port corresponding to the analysis unit to be used.

In a case of using a sampler that supplies a vial to the injector, the position of the transfer arm when the transfer arm of the sampler transfers a vial to and from the turret of the injector needs to be stored in the system by teaching executed at least at the time of installation of the sampler. When the position of the injector on the gas chromatograph main body is changed, a relative positional relationship between the injector and the sampler is also changed, and, for this reason, it is necessary to execute teaching again. Therefore, teaching of the sampler is required every time the analysis unit used for analysis is changed, and the work load of the user increases.

The present invention has been made in view of the above problem, and an object of the present invention is to make teaching of a sampler unnecessary when the position of the injector on the gas chromatograph main body is changed.

A gas chromatography analysis system according to the present invention includes a gas chromatograph main body comprising an upper surface on which a plurality of injection ports are provided, an injector arranged on the gas chromatograph main body for corresponding to an injection port optionally selected from the plurality of injection ports, and being configured to inject a sample through the corresponding injection port, a sampler for supplying a vial containing liquid to the injector, the sampler being arranged at a position determined according to a position of the injector on the gas chromatograph main body so as to have a specific positional relationship with the injector, and the sampler being engaged with the gas chromatograph main body or the injector. That is, in the present invention, the sampler is positioned at a position according to a position of the injector on the gas chromatograph main body so that a relative positional relationship between the sampler and the injector is always constant.

According to the gas chromatography analysis system according to the present invention, the sampler is arranged at a position determined according to a position of the injector on the gas chromatograph main body so as to have a specific positional relationship with the injector, and the sampler is engaged with the gas chromatograph main body or the injector. In this manner, a relative positional relationship between the sampler and the injector is always constant. Therefore, it is not necessary to perform teaching of the sampler even when the position of the injector on the gas chromatograph main body is changed.

DETAILED DESCRIPTION OF THE INVENTION

Hereinafter, an embodiment of the gas chromatography analysis system according to the present invention will be described with reference to the drawings.

Figure 1:
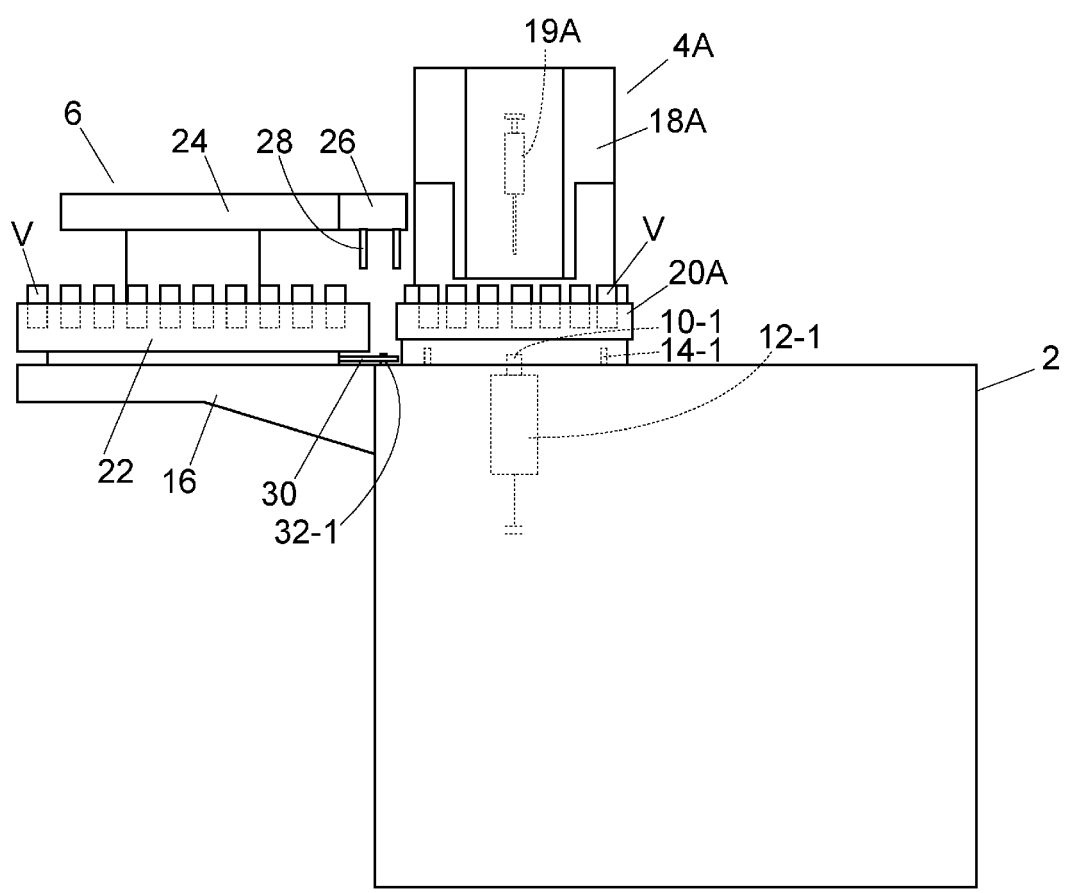
FIG. 1 is a front view illustrating one embodiment of a gas chromatography analysis system.
Figure 2:
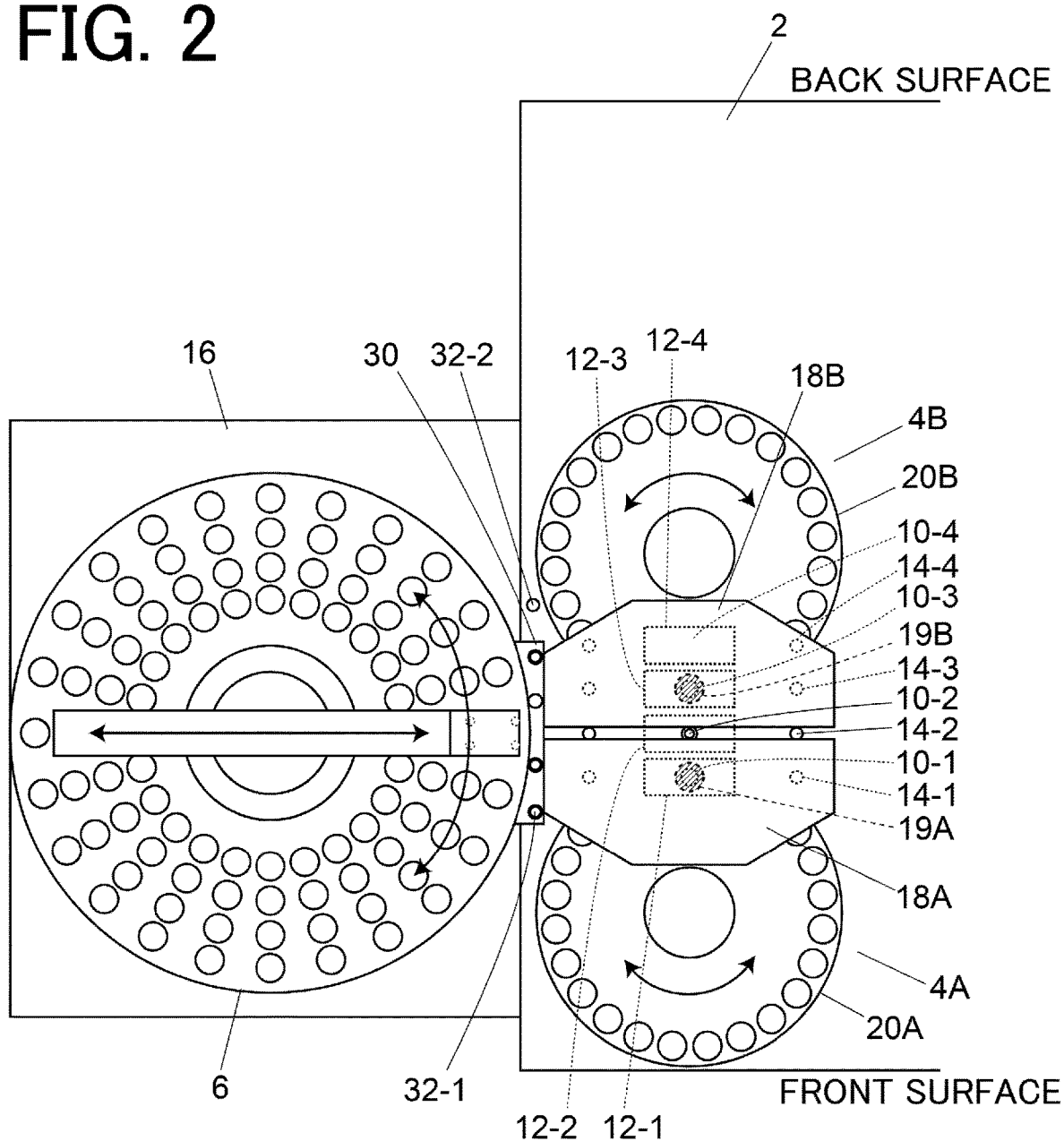
FIG. 2 is a diagram of the embodiment as viewed from above.

FIG. 1 is a front view illustrating an embodiment of the gas chromatography analysis system, and FIG. 2 is a view of the gas chromatography analysis system as viewed from above.

The gas chromatography analysis system of the present embodiment includes a gas chromatograph main body 2, two injectors 4A and 4B, and a sampler 6. Note that, in the present embodiment, the two injectors 4A and 4B are included. However, there may be a configuration including only one injector.

The gas chromatograph main body 2 can include a plurality of sample vaporizing chambers in the inside. In the present embodiment, a case where four sample vaporizing chambers 12-1 to 12-4 are mounted inside the gas chromatograph main body 2 will be described. However, there may be a case where three or less sample vaporizing chambers are mounted. Further, a maximum mountable number of sample vaporizing chambers may be five or more.

Injection ports 10-1 to 10-4 respectively communicating with the sample vaporizing chambers 12-1 to 12-4 are provided on an upper surface of the gas chromatograph main body 2. The injection ports 10-1 to 10-4 are provided side by side in the same straight line on the upper surface of the gas chromatograph main body 2. The sample vaporizing chambers 12-1 to 12-4 are for vaporizing a sample injected through the injection ports 10-1 to 10-4 to generate sample gas. Inside the gas chromatograph main body 2, a separation column connected to the downstream side of each of the sample vaporizing chambers 12-1 to 12-4 and a detector connected to the downstream side of these separation columns are provided. A component in sample gas generated in the sample vaporizing chambers 12-1 to 12-4 is separated in the separation column, and the separated component is detected by the detector.

The injectors 4A and 4B are mounted on the gas chromatograph main body 2. The injector 4A has an injector main body 18A and a circular turret 20A, and the injector 4B has an injector main body 18B and a circular turret 20B. The injectors 4A and 4B have a front surface and a back surface, and the circular turrets 20A and 20B are arranged on the front surface side of the injectors 4A and 4B, respectively. The injectors 4A and 4B are arranged such that their back surfaces face each other. Syringes 19A and 19B for sucking and dispensing liquid are provided inside the injector main bodies 18A and 18B, respectively. The syringes 19A and 19B are provided to be movable up and down in a state where tips for sucking and dispensing liquid face vertically downward.

The sampler 6 is placed on a sampler mounting table 16 provided on the gas chromatograph main body 2. The sampler 6 is a device that is located on the side of the injectors 4A and 4B and supplies a vial V containing a sample to the circular turrets 20A and 20B of the injectors 4A and 4B. The sampler 6 includes a vial holder 22 and a transfer arm 24. The vial holder 22 is a circular table in which a plurality of the vials V are arranged in a planar manner. The transfer arm 24 is provided so as to extend in the horizontal direction on the vial holder 22, and includes a gripper 26 for holding the vial V in a tip portion. The transfer arm 24 can move the gripper 26 to an optional position of the vial holder 22 and a predetermined transfer position set outside the vial holder 22 by rotation in a horizontal plane with the center of the vial holder 22 as a rotation center and sliding in the axial direction. The gripper 26 includes a plurality of claws 28 extending downward to grip an outer peripheral surface of the vial V from above.

A plurality of protruding positioning pins 14-1 to 14-4 for positioning the injectors 4A and 4B are provided on an upper surface of the gas chromatograph main body 2. The positioning pin 14-1 is provided to correspond the injector 4A to the injection port 10-1, the positioning pin 14-2 is provided to correspond the injector 4A to the injection port 10-2, the positioning pin 14-3 is provided to correspond the injector 4B to the injection port 10-3, and the positioning pin 14-4 is provided to correspond the injector 4B to the injection port 10-4.

In the example of FIG. 2, the syringe 19A of the injector 4A is positioned immediately above the injection port 10-1 as the positioning pin 14-1 is fitted into a predetermined hole provided on a lower surface of the injector 4A. Further, the syringe 19B of the injector 4B is positioned immediately above the injection port 10-3 as the positioning pin 14-3 is fitted into a predetermined hole provided on a lower surface of the injector 4B. That is, the injector 4A corresponds to the injection port 10-1, and the injector 4B corresponds to the injection port 10-3. The injector 4A sucks a sample from the vial V set in the turret 20A using the syringe 19A, and injects the sample into the sample injection portion 12-1 through the injection port 10-1. The injector 4B sucks a sample from the vial V set in the turret 20B using the syringe 19B, and injects the sample into the sample injection portion 12-3 through the injection port 10-3.

By changing the positions of the injectors 4A and 4B on the gas chromatograph 2, injection ports to which the injectors 4A and 4B correspond can be changed. By moving the injectors 4A and 4B from the state of FIG. 2 to the back side of the gas chromatograph 2, the injector 4A can be made to correspond to the injection port 10-2, and the injector 4B can be made to correspond to the injection port 10-4 (see FIG. 5).

Hereinafter, positions (positions in FIG. 2) of the injectors 4A and 4B when the injector 4A corresponds to the injection port 10-1 and the injector 4B corresponds to the injection port 10-3 are referred to as "first positions", and positions (positions in FIG. 5) of the injectors 4A and 4B when the injector 4A corresponds to the injection port 10-2 and the injector 4B corresponds to the injection port 10-4 are referred to as "second positions".

The position of the sampler 6 on the sampler mounting table 16 is determined according to the positions of the injectors 4A and 4B. On the upper surface of the gas chromatograph main body 2, a pair of a first positioning pins 32-1 and a pair of second positioning pins 32-2 having a protruding shape for the sampler 6 are alternately arranged in the same straight line. A pair of the first positioning pins 32-1 are an engagement portion used for positioning the sampler 6 when the injectors 4A and 4B are arranged at the first position, and a pair of the second positioning pins 32-2 are an engagement portion used for positioning the sampler 6 when the injectors 4A and 4B are arranged at the second position.

Figure 3:
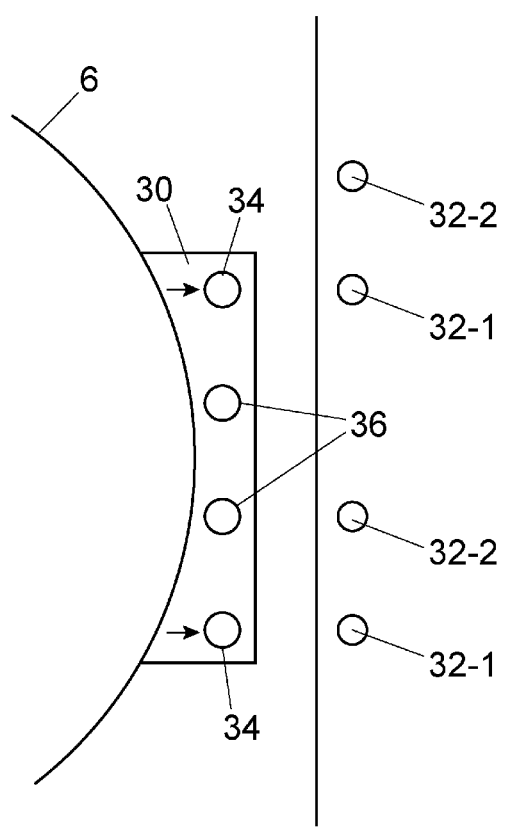
FIG. 3 is a view illustrating a positioning structure of a sampler in the embodiment.

The sampler 6 is provided with a positioning plate 30 for positioning the sampler 6 at a predetermined position using the first positioning pin 32-1 and the second positioning pin 32-2. As illustrated in FIG. 3, a pair of positioning holes 34 for inserting a pair of the first positioning pins 32-1 or a pair of the second positioning pins 32-2 is provided in both end portions (an upper end portion and a lower end portion in FIG. 3) of the positioning plate 30, and two clearance holes 36 are provided between a pair of the positioning holes 34. In this example, a pair of the positioning holes 34 are marked with an arrow so as to be distinguishable from the clearance hole 36.

Figure 4:
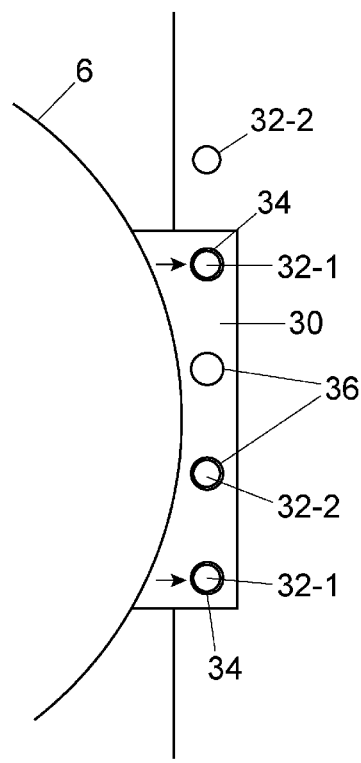
FIG. 4 is a view illustrating a state of the positioning structure when the sampler is positioned at a position corresponding to an injector arranged at a first position.

In a case where the injectors 4A and 4B are arranged at the first position, that is, in a case where the injector 4A corresponds to the injection port 10-1 and the injector 4B corresponds to the injection port 10-3, the sampler 6 is arranged such that each of a pair of the first positioning pins 32-1 are inserted into the positioning hole 34 of the positioning plate 30, as illustrated in FIG. 4. In this manner, the first positioning pin 32-1 is engaged with the sampler 6, and the sampler 6 is positioned at a position corresponding to the injectors 4A and 4B arranged at the first position. At this time, the position of the positioning pin 32-1 is designed such that a relative positional relationship between the sampler 6 and the injector 4A is a specific positional relationship (first positional relationship), and a relative positional relationship between the sampler 6 and the injector 4B is a specific positional relationship (second positional relationship).

Figure 5:
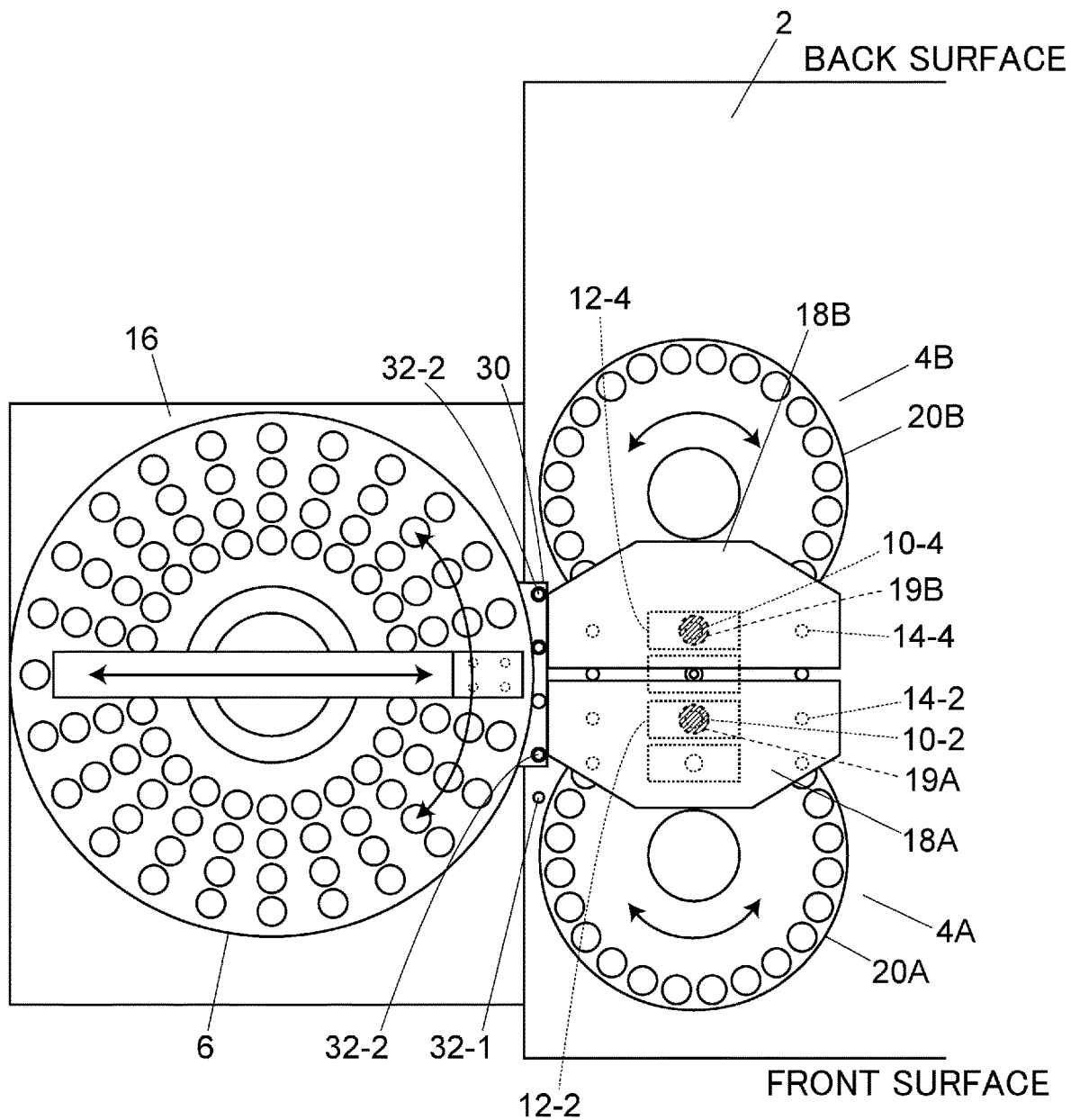
FIG. 5 is a view illustrating a state of when the position of the injector is moved to a second position in the embodiment.
Figure 6:
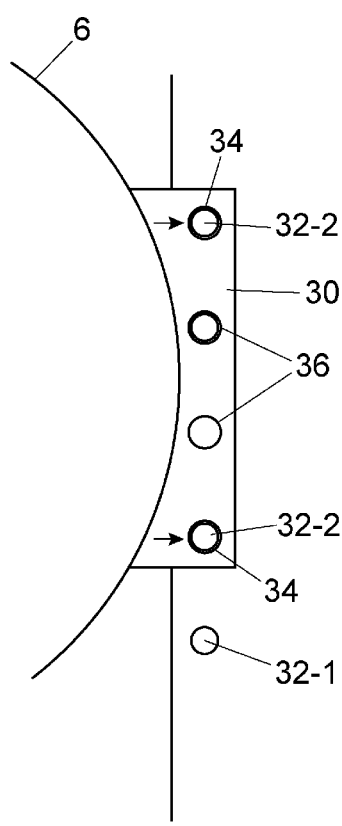
FIG. 6 is a view illustrating a state of the positioning structure of when the sampler is moved to a position corresponding to the injector arranged at the second position.

As illustrated in FIG. 5, in a case where the injectors 4A and 4B are arranged at the second position, that is, in a case where the injector 4A corresponds to the injection port 10-2 and the injector 4B corresponds to the injection port 10-4, the sampler 6 is arranged such that each of a pair of the second positioning pins 32-2 are inserted into the positioning hole 34 of the positioning plate 30, as illustrated in FIG. 6. In this manner, the second positioning pin 32-2 is engaged with the sampler 6, and the sampler 6 is positioned at a position corresponding to the injectors 4A and 4B arranged at the second position. Also at this time, the position of the positioning pin 32-2 is designed such that a relative positional relationship between the sampler 6 and the injector 4A is a specific positional relationship (first positional relationship), and a relative positional relationship between the sampler 6 and the injector 4B is a specific positional relationship (second positional relationship).

As described above, in the present embodiment, it is easy to position the sampler 6 so that the relative positional relationships with the injectors 4A and 4B become a specific positional relationship regardless of the positions where the injectors 4A and 4B are arranged. In this manner, the relative position of the sampler 6 with respect to the injectors 4A and 4B can be kept constant both when the injectors 4A and 4B are arranged at the first position and when the injectors 4A and 4B are arranged at the second position, so that teaching information of the sampler 6 acquired before the positions of the injectors 4A and 4B are changed can be used without a change. Therefore, when the positions of the injectors 4A and 4B are changed, it is not necessary to execute teaching of the sampler 6 again.

In the above embodiment, the injectors 4A and 4B include the circular turrets 20A and 20B, and in a case where the positions of the injectors 4A and 4B are to be changed, there may be a problem that the turrets 20A and 20B interfere with the sampler 6 unless the position of the sampler 6 is also changed. However, as described above, since the sampler 6 can be positioned at a position corresponding to the positions of the injectors 4A and 4B, teaching after the position change can be omitted. Note that the present invention is not limited to this, and the turret provided in the injector may be linear.

Further, in the above embodiment, the sampler 6 is positioned by the positioning pins 32-1 and 32-2 provided in the gas chromatograph main body 2 being engaged with the sampler 6. However, the present invention is not limited to this configuration. The sampler 6 and the injector 4A, and the sampler 6 and the injector 4B may be engaged with each other so that the relative positional relationship between the sampler 6 and the injectors 4A and 4B is maintained to be constant regardless of the positions of the injectors 4A and 4B.

Further, the above embodiment is described on the premise that two injectors are included. However, the present invention can be similarly applied to a case where only one injector is used. In short, even in a case where only one injector is used, the sampler only needs to be positioned according to the position of the injector so that the injector and the sampler always have a specific positional relationship. For example, in a case where only one of the injector 4A is used, the injector 4A can be made to correspond to any of the injection ports 10-1 to 10-4. In this manner, the injector 4A can take four positions. In this case, the sampler 6 can be positioned at a position corresponding to the position of the injector 4A such that the injector 4A and the sampler 6 have a specific positional relationship regardless of the position of the injector 4A.

Further, in the above embodiment, in a case where two of the injectors 4A and 4B are used, only two positions, the "first position" in which the injector 4A corresponds to the injection port 10-1 and the injector 4B corresponds to the injection port 10-3 and the "second position" in which the injector 4A corresponds to the injection port 10-2 and the injector 4B corresponds to the injection port 10-4, can be taken. However, the present invention is not limited to this configuration. For example, the configuration may be such that such that a "first position" in which the injector 4A corresponds to the injection port 10-1 and the injector 4B corresponds to the injection port 10-2, a "second position" in which the injector 4A corresponds to the injection port 10-2 and the injector 4B corresponds to the injection port 10-3, and a "third position" in which the injector 4A corresponds to the injection port 10-3 and the injector 4B corresponds to the injection port 10-4 can be taken. In such a case, the sampler 6 is configured to be able to be positioned at a position where the injectors 4A and 4B and the sampler 6 have a specific positional relationship regardless of whether the injectors 4A and 4B take any of the first position, the second position, and the third position.

That is, the embodiment described above is merely an example of embodiments of the gas chromatography analysis system according to the present invention. The embodiments of the gas chromatography analysis system according to the present invention is as shown below.

An embodiment of gas chromatography analysis system according to the present invention includes a gas chromatograph main body comprising an upper surface on which a plurality of injection ports are provided, an injector arranged on the gas chromatograph main body for corresponding to an injection port optionally selected from the plurality of injection ports, and being configured to inject a sample through the corresponding injection port, a sampler for supplying a vial containing liquid to the injector, the sampler being arranged at a position determined according to a position of the injector on the gas chromatograph main body so as to have a specific positional relationship with the injector, and the sampler being engaged with the gas chromatograph main body or the injector.

In a first aspect of the above embodiment, the gas chromatograph main body includes a plurality of engagement portions configured to engage with the sampler arranged at each position determined so that the sampler has the specific positional relationship with the injector, according to a position of the injector on the gas chromatograph main body. With such an aspect, it is easy to arrange the sampler to each position determined according to the position of the injector.

In the first aspect, each of the plurality of engagement portions may be at least one pin that engages with the sampler by being inserted into a hole provided on the sampler.

In a second aspect of the above embodiment, the injector has a front surface and a back surface, the injector includes a circular turret configured so that a plurality of vials are set side by side on a same circumference, and the circular turret is arranged on a front surface side of the injector.

The second aspect may further include an additional injector arranged on the gas chromatograph main body for corresponding to an injection port different from the injection port to which the injector corresponds. The injector and the additional injector may be arranged in such a way that back surfaces of the injector and the additional injector face each other, and the sampler may be arranged at a position determined so as to have a first positional relationship with the injector and a second positional relationship with the additional injector, and the sampler may be engaged with the gas chromatograph main body, or the sampler may be engaged with the injector and the additional injector.

DESCRIPTION OF REFERENCE SIGNS 2 gas chromatograph main body
4A, 4B injector
6 sampler
10-1 to 10-4 injection port
12-1 to 12-4 sample vaporizing chamber
14-1 to 14-4 positioning pin (for injector)
16 sampler mounting table
18A, 18B injector main body
19A, 19B syringe
20A, 20B circular turret
22 vial holder
24 transfer arm
26 gripper
28 claw
30 positioning plate
32-1 first positioning pin
32-2 second positioning pin
34 positioning hole
36 clearance hole

What is claimed is:

1. A gas chromatography analysis system comprising:
a gas chromatograph main body comprising an upper surface on which a plurality of injection ports including a first injection port and a second injection port are provided, wherein a first pin and a second pin are provided on the upper surface of the gas chromatograph main body, and positional relationship between the first injection port and the second injection port is the same as positional relationship between the first pin and the second pin;
an injector having a syringe for injecting a sample though each of the injection port and arranged on the gas chromatograph main body; and
a sampler for supplying a vial containing liquid to the injector, wherein the sampler has a hole that is configured for being engaged with the first pin in a first state and the second pin in a second state,
in the first state where the first pin and the hole are engaged with each other, the sampler has a specific positional relationship with the injector arranged on the upper surface of the gas chromatograph main body to arrange the syringe directly above the first injection port, and
in the second state where the second pin and the hole are engaged with each other, the sampler has the same specific positional relationship with the injector arranged on the upper surface of the gas chromatograph main body to arrange the syringe directly above the second injection port.

2. The gas chromatography analysis system according to claim 1, wherein the injector has a front surface and a back surface, the injector includes a circular turret configured so that a plurality of vials are set side by side on a same circumference, and the circular turret is arranged on a front surface side of the injector.

3. The gas chromatography analysis system of claim 2, further comprising an additional injector arranged on the gas chromatograph main body for corresponding to an injection port different from the injection port to which the injector corresponds,
wherein the injector and the additional injector are arranged in such a way that back surfaces thereof face each other, and
the sampler is arranged at a position determined so as to have a first positional relationship with the injector and a second positional relationship with the additional injector, and
the sampler is engaged with the gas chromatograph main body, or
the sampler is engaged with the injector and the additional injector.

* * * * *